United States Patent [19]

Hellermann et al.

[11] Patent Number: 4,814,386

[45] Date of Patent: Mar. 21, 1989

[54] ABC BLOCK COPOLYMERS BASED ON BUTADIENE AND ISOPRENE, PROCESS FOR THEIR PREPARATION AND USE

[75] Inventors: Walter Hellermann, Dorsten; Christoph Herrmann; Hans-Bernd Fuchs, both of Marl; Karl-Heinz Nordsiek, Marl; Jürgen Wolpers, Haltern; Hans-Eberhard von Portatius, Dorsten, all of Fed. Rep. of Germany

[73] Assignee: Huels Aktiengesellschaft, Marl, Fed. Rep. of Germany

[21] Appl. No.: 85,113

[22] Filed: Aug. 14, 1987

[30] Foreign Application Priority Data

Aug. 14, 1986 [DE] Fed. Rep. of Germany ....... 3627675
Sep. 18, 1986 [DE] Fed. Rep. of Germany ....... 3631706
Mar. 26, 1987 [DE] Fed. Rep. of Germany ....... 3710002

[51] Int. Cl.$^4$ ............................................. C08F 297/02
[52] U.S. Cl. ............................... 525/258; 152/209 R; 525/250; 525/271; 525/314; 525/914
[58] Field of Search ............... 525/314, 271, 250, 914, 525/258; 152/209 R

[56] References Cited

U.S. PATENT DOCUMENTS 4,413,098 11/1983 Hattori et al. ............... 525/314
4,673,709 6/1987 Nordsiek et al. .

FOREIGN PATENT DOCUMENTS 1231657 5/1971 United Kingdom ............ 152/209 R
2090840A 7/1982 United Kingdom .

OTHER PUBLICATIONS

Kunststoffe 38, 178 (1985) pp. 178–185, The "Integral Rubber" Concept–an Approach to an Ideal Tire Tread Rubber.
Kunststoffe 39, 599 (1986) Die $T_g$-Beziehung–Grundlagen und Bedeutung fur die Kautschuktechnologie.

*Primary Examiner*—Wilbert J. Briggs, Sr.
*Attorney, Agent, or Firm*—Millen & White

[57] ABSTRACT

ABC block copolymers on the basis of butadiene, isoprene and optionally styrene, are provided by a polymerization process wherein the resultant block copolymer comprises:

about 40 to 75 wt % of a block A based on butadiene (uniformly distributed vinyl group content less than about 15 wt %), up to about 25 wt % of a block B based on butadiene and isoprene (vinyl content less than about 15 wt %) or based on butadiene (vinyl content more than about 75 wt %)

about 20 to 55 wt % of a block C based on butadiene and isoprene (vinyl content more than about 75 wt %). The ABC block copolymers are useful for the production of tire treads.

30 Claims, 2 Drawing Sheets

ABC BLOCK COPOLYMERS BASED ON BUTADIENE AND ISOPRENE, PROCESS FOR THEIR PREPARATION AND USE

BACKGROUND OF THE INVENTION

The present invention relates to unsaturated elastomeric ABC block copolymers based on butadiene, isoprene and optionally styrene, their manufacture and their use for the manufacture of tire treads.

It is generally accepted that rubbers which are to be employed in tire making must satisfy the following requirements:

Cold creep must be as low as possible.

The rubbers must be readily processable in subsequent blending processes.

The rubbers must be flowable during the molding processes.

The rubbers must be readily vulcanizable.

In addition, special requirements have to be complied with which arise from their particular application in tire making. It is well known that in recent times increased demands are being made on the properties of tire treads:

(a) They are required to remain highly resilient even at low temperatures.

(b) They must exhibit good anti-skid properties in wet conditions.

(c) They are required to have high abrasion resistance to provide a correspondingly long life expectancy.

(d) When subjected to dynamic loads they should generate as little heat as possible. Their rolling resistance is to be as low as possible in order to keep the fuel consumption of the vehicle as low as possible.

It is known that rubbers, when subjected to torsional vibration tests exhibit a temperature dependency of the logarithmic decrement of mechanical damping and derived therefrom a temperature dependency of the mechanical loss factor tan delta which, when expressed as a graph, yields a graph configuration which is characteristics for the particular rubber. The desired requirements for tire treads are met in particular if the tan delta-curve comprises a vibration damping range which is as wide as possible (cf. K. H. Nordsiek. Kautschuk und Gummi, Kunstoffe 38, 178 (1985) and 39, 599 (1986).

It is also known that these partly contradictory properties of tire treads are determined to a substantial extent by the nature and composition of the rubbers employed for this purpose.

The homopolymers based on the conventionally employed monomeric raw materials such as butadiene, isoprene and styrene do not meet these requirements satisfactorily (cf. EP-OS 0 054 204 and JP-OS 82/87 406).

Blends of rubber types are in practice subject to the disadvantage that the above stated spectrum of properties is not attained and the desired technological qualities for tires are not reproduced reliably. Accordingly, there exists a need for rubbers which substantially satisfy the aforesaid desired properties. In principle it should be possible to attain this object with rubbers composed of polymers comprising a variety of blocks.

For purposes of this invention, the meaning of blocks of a polymer is not restricted to only chain segments each composed of different monomeric building elements, but also includes those segments which—dictated by the extraneous process parameters—vary in their nature of interlinking of the monomeric building elements or in the proportion in which they are inserted in a chain segment. Although the butadiene-isoprene copolymer described in EP-OS 0 054 204 comprises in its initial and terminal portion a different content of isoprene as a result of the lower tendency of isoprene to polymerize as compared with butadiene, it is not to be considered a block copolymer within the meaning just explained.

Even if during the copolymerization of dienes and styrene the styrene proportion is changed (cf. DE-OS 31 08 583) no block copolymers are attained, but merely a gradual transition. The desired improvement of tire technological properties is still inadequate, even in that case. Single phase rubber systems are described in DE-OS 31 08 583 comprising a damping maximum created by a glass transition point in a very narrow temperature range.

An improvement is attained only by virtue of a copolymer being produced comprising two different blocks A and B which differ in their structure and/or composition.

A statistical styrene-butadiene block copolymer is thus described for example in DE-OS 31 51 139. The blocks differ in their butadiene contents and their contents of vinyl bonds. They are so intermixed that they are rendered compatible and that instead of two separated damping maxima only a single such maximum is created.

In DE-OS 35 30 438 rubber compositions are claimed which comprise at least 20 wt% of a styrene-butadiene block copolymer. The blocks differ with respect to their styrene contents, their vinyl bond contents and as a result thereof their glass transition temperatures. In that case as well, the tan delta curve exhibits only a narrow temperature range of maximum damping.

Japanese published specification 83/122 907 describes branched rubbers which may be obtained by the conversion, e.g., of a metallic tetrahalogen compound, such as $SnCl_4$ with block copolymers comprising a polysioprene and a polybutadiene block. Thus each of the two blocks is present as a homopolymer. The starshaped rubber which is attained after conversion with the metallic coupling agent forms a single phase rubber system having a glass transition point.

GB-PS 2 090 840 describes block copolymers which are attained by the polymerization of dienes or the copolymerization of diene mixtures and the blocks of which differ in respect of their contents of 1,2 and/or 3,4 structural units by 20 to 50 mol wt%. The preparation of such block copolymers takes place in the presence of different amounts of cocatalyst or at different temperatures.

Tire treads are described in EP-OS 0 173 791, the rubber component of which may be composed to 30 to 100 wt% of block copolymers based on butadiene, isoprene and optionally sytrene and/or piperylene. The block copolymers are produced in the presence of cocatalysts by increasing the temperature and may comprise AB or ABC structures. The polymers always contain a terminal block based on butadiene which is formed at rising temperatures and which accordingly comprises a comparatively high content of 1,2 structural units and an uneven distribution of the vinyl groups. However, these block copolymers do not yield a tan delta-curve having an adequately wide plateau in order to comply optimally with all required tire properties (see comparative example A). Accordingly, even that sspecification proposes to blend the block copolymers so obtained with other rubber components (see claim 1 and example 2). All aforementioned block copolymers are subject to at least one of the following shortcomings:
1. The block copolymers do not satisfy adequately the above-mentioned requirements with a view to their use as tire materials.
2. Compatibility problems of the two blocks are experienced.
3. The tan delta curve exhibits only a narrow damping maximum.
4. Large amounts of comparatively expensive isoprene are required.

SUMMARY OF THE INVENTION

An object of the present invention is to develop ABC block copolymers based on isoprene and butadiene which provide a tan delta curve of a vibration damping region so broad that an admixture of further rubber components for broadening the vibration damping range is no longer required. Preferably this vibration damping region is about −90° C. to +30° C.

Upon further study of the specification and appended claims, further objects and advantages of this invention will become apparent to those skilled in the art.

These objects are surprisingly achieved by ABC block copolymers which contain about 45 to 80 wt% butadiene, about 5 to 40 wt% isoprene and about 0 to 30 wt% styrene.

The copolymers in terms of blocks comprise:
about 40 to 75 wt% of a block A consisting of butadiene units with a content of uniformly distributed vinyl groups of less than about 15 wt%,
about 1 to about 25 wt% of a block B which contains
either butadiene and isoprene units with a vinyl content of less than about 15 wt%,
or butadiene units having a vinyl content of more than about 75 wt%, and
about 20 to 55 wt% of a block C, which comprises butadiene and isoprene units having a vinyl content of more than about 75 wt%.

The preferred copolymers comprise:
40 to 65 wt% of a block A consisting of butadiene units with a content of uniformly distributed vinyl groups of 8 to 15 wt%,
5 to 15 wt% of a block B which contains
either butadiene and isoprene units with a vinyl content of 8 to 15 wt%,
or butadiene units having a vinyl content of 75 to 90 wt%, and
30 to 50 wt% of a block C, which comprises butadiene and isoprene units having a vinyl content of 75 to 90 wt%.

Preferably the content of isoprene units in block B does not exceed about 33 wt%, more preferably in the range of 0 to 25 wt%. Preferably the content of butadiene units in block C is about 5 to 40 wt%. Block B and/or block C may comprise styrene in amounts up to about 40 wt%, preferably 5 to 40 wt%.

The ABC block copolymers may be linear as well as branched. Such branching may be attained during the polymerization by means of a branching agent or with the aid of a coupling agent towards the end of the polymerization. The preferred amount of branching within the ABC block copolymers is 50 to 90 wt%.

The process for the manufacture of block copolymers comprises anionic polymerization of the monomers in an inert organic solvent in the presence of a Li-organic compound and a cocatalyst, characterized in that initially a block A is produced by the polymerization of butadiene in the absence of a cocatalyst. Thereafter block B is produced wherein, optionally in the presence of styrene, either (1) butadiene and isoprene are polymerized in the absence of a cocatalyst or (2) polymerization of butadiene is continued in the presence of a cocatalyst. Thereafter, a mixture of butadiene and isoprene, optionally also styrene, is polymerized in the presence of a cocatalyst to product block C.

In principle it is possible to introduce into the reaction vessle at the commencement of the polymerization of each block the amounts of monomers which are required for the preparation of each block. However, it is also possible, for example, to introduce at the commencement of the polymerization of block A the total amount of butadiene and to commence the preparation of block B by the addition of the cocatalyst or isoprene and thereafter commence production of block C by introducing isoprene and cocatalyst. Preferably, if the total amount of butadiene is added at commencement of polymerization of block A, production of block B is initiated after at least about 40 wt%, preferably 50 wt% of monomeric butadiene has been converted. The indicated conversion refers to the conversion of the total amount of butadiene employed in the process. The same considerations apply to the introduction of the isoprene. If the total amount of isoprene is added at the commencement of polymerization of block B, production of block C is initiated after at least about 40 wt%, preferably 45 wt% of monomeric butadiene and isoprene has been converted. The indicated conversion refers to the total combined amount of these two monomers.

The combined use of styrene as a comonomer for blocks B and/or C is preferred.

Finally, the invention also relates to the use of the ABC block copolymers for the manufacture of tire treads.

DETAILED DESCRIPTION

Figure 1:
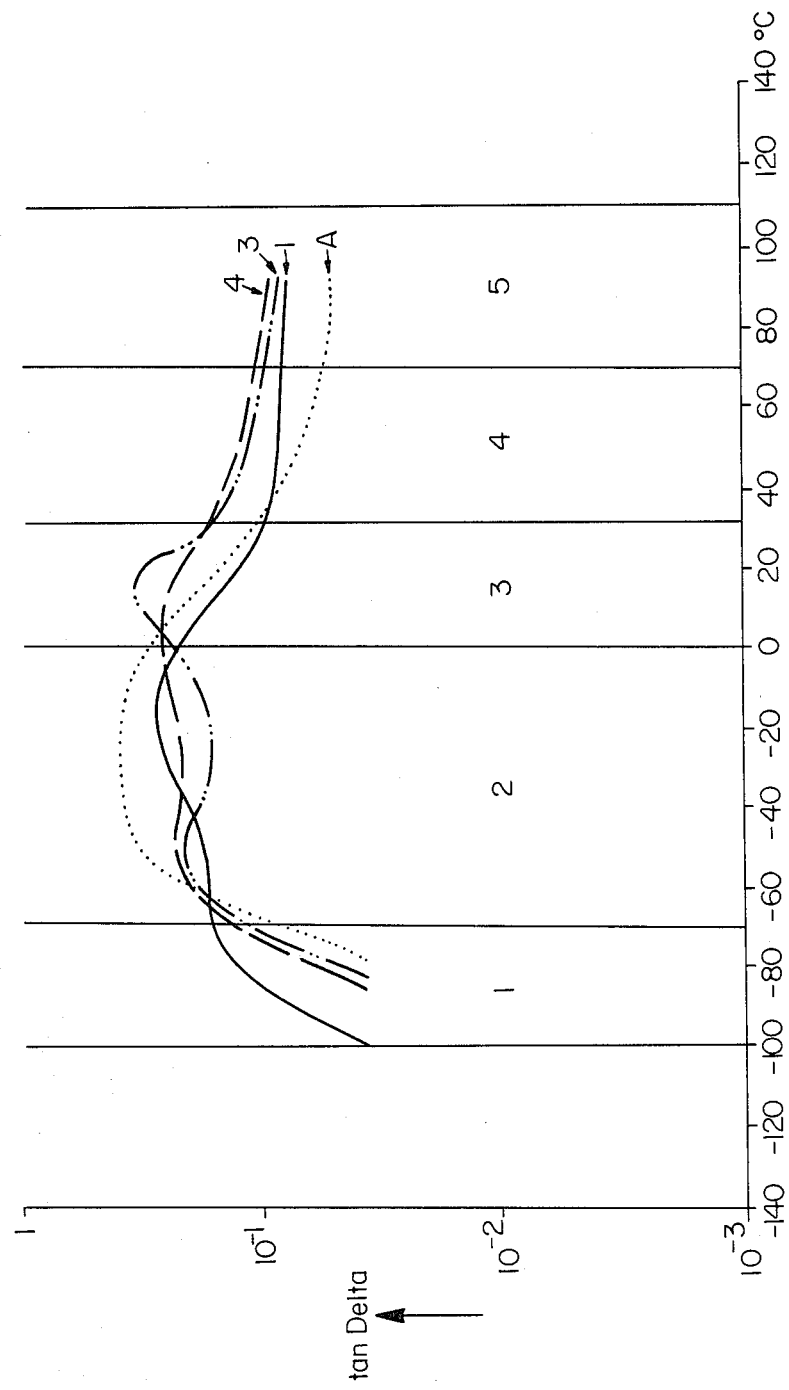

An inert organic solvent is employed as the reaction medium. Hydrocarbons having 6 to 12 C atoms such as pentane, hexane, heptane, octane and decane and their cyclic analogues are particularly suitable. Aromatic solvents, e.g., benzene, toluene, xylene and others are also suitable. It stands to reason that mixtures of the aforementioned solvents may also be employed Alkyl lithium compounds which can readily be obtained by the conversion of lithium with the corresponding alkylhalogenides are employed as catalysts. Monofunctional Li-organic compounds are preferred. The alkyl moieties comprise 1 to 10 C atoms. Individual hydrogen atoms may be substituted by phenyl moieties. The following alkyl lithium compounds are particularly suitable: methyllithium, ethyllithium, pentyllithium, n-butyllithium being particularly preferred. Further suitable lithium compounds are to be found in Advances in Polymer Science, 56, 1–90 (1984).

In order to improve the cold creep properties, at least one polymerization stage is preferably carried out in the presence of small amounts of branching agent, e.g., divinylbenzene (DVB). Not more than about 0.5 parts DVB based on 100 parts monomer are employed. Such addition is dispensed with if after the polymerization a coupling reaction is provided for.

The nature and amount of catalyst and branching agent are generally selected so that the block copolymer obtained has the following properties:

Mooney viscosity (ML$_{1-4}$, 100° C. DIN 53 523):
   about 40 to 140, preferably 35 to 120;

Non-uniformity U=(Mw/Mn)-1, determined by gel permeation chromatographic analysis (GPC analysis):
   about 0.5 to 5.0, preferably 0.6 to 3.0;

Defo elasticity (80° C., DIN 53 514):
   >about 10, preferably >20.

In the present process individual blocks are prepared in the absence of the cocatalyst while others are prepared in the presence of a cocatalyst.

In the former case, i.e., when the cocatalyst is absent, the process is carried out at temperatures of about 20° to 120° C., preferably 20° to 80° C., and in the case of the dienes, polymers are obtained comprising more than 85 wt% 1,4 structural units of the general formula

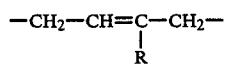

R=H (butadiene)
R=CH$_3$ (isoprene)

In the second case, i.e., when the cocatalyst is present, the object is to obtain polymers with as high as possible a content of 1,2 and/or 3,4 structural units. In this case, the process is carried out at temperatures of about 20° to 100° C., preferably 20° to 80° C.

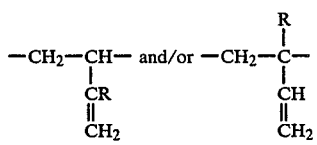

R=H (Butadiene)
R=CH$_3$ (Isoprene)

Thus the cocatalysts are selected in accordance with their ability to control the microstructure, i.e., the manner in which the polymerization proceeds in respect of directing it towards as complete as possible a formation of 1,2 and/or 3,4 structural units. The cocatalyst is generally selected from the group of
   ethers,
   tertiary amines or
   tertiary amines containing ether groups or mixtures thereof.

Suitable ethers comprise in particular dialkyl ethers of ethylene glycol and diethylene glycol, their alkyl groups each comprising 1 to 4 C atoms. In other words, suitable ethers comprise those of the formula

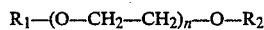

wherein n=1 or 2 and R$_1$ and R$_2$ are each independently alkyl groups having 1-4 C atoms.

Ethers of the general formula

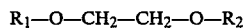

are preferred in particular for the manufacture of branched block copolymers, R$_1$ and R$_2$ representing alkyl moieties having different numbers of C atoms selected from the group of methyl, ethyl, n- and iso-propyl as well as n-, iso-, sec.- and tert. butyl. Preferably the sum of the C atoms of the two moieties R$_1$ and R$_2$ is from 5 to 7, more particularly 6. A particularly suitable ethylene glycol ether is the compound wherein R$_1$=ethyl and R$_2$=tert. butyl. The glycol ethers are for example obtainable in accordance with the principles of the Williamson synthesis from a sodium alcoholate and an alkyl halogenide. The ethers of the formula

may be produced in a simple manner by converting the corresponding alcohol

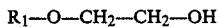

with isobutene in the presence of an acid ion exchanger.

Suitable tertiary amines are for example N,N,N',N'-tetramethylethylene diamine, N,N,N',N'-tetraethylethylene diamine and triethylene diamine.

Suitable amines containing ether groups are N-methylmorpholine and N-ethylmorpholine.

The cocatalyst is employed in a ratio of about 2:1 to 30:1, in particular 2:1 to 50:1 based on the mol number of the catalyst. At higher temperatures larger quantities of cocatalyst are generally required in order to attain the desired microstructure control. Reaction temperatures of 100° C. should not be exceeded. The polymerization is advantageously carried out at constant temperature. It is possible, however, to operate at rising or falling temperatures; in that case, however, care must be taken that the microstructures does not suffer fundamental change.

In the production of the blocks B and/or C styrene may be added as a comonomer. Care must be taken by suitable expedients to ensure that the content of polystyrene blocks in the ABC block copolymer does not exceed 2 wt% by mass. (A process for determining the content of polystyrene blocks is described in the textbook Houben-Weyl "Methoden der Organischen Chemie", Vol. 14/1 (1061), page 698.) It is also possible to add part of the styrene to block C towards the end of the polymerization.

It is well known that certain compounds proposed as cocatalysts have the property of suppressing the formation of polystyrene blocks. The same property is present in compounds which are known as randomizers and which are usually potassium salts of alcoholates as well as organic carboxylic and sulphonic acids.

In accordance with a particular embodiment of the process, the "live polymers" present at the end of the polymerization can be converted into branched or star-shaped block copolymers with a coupling agent.

Suitable coupling agents are polyepoxides such as epoxidized linseed oil, polyisocyanates, polyketones such as 1,3,6-hexanetrione, polyanhydrides, for example the dianhydride of pryomellithic acid and dicarboyxlic acid esters such as adipic acid dimethylester. Particularly suitable are
   the tetrahalogenides of the elements Si, Ge, Sn and Pb, in particular SiCl$_4$,
   organic compounds of the general formula R$_n$[SiHal$_3$]$_n$, wherein n=1 to 6, in particular m=1 and 2. In this context R is an organic moiety bearing 6 to 16 carbon atoms and having a valency of n, for example an aliphatic, cycloaliphatic or aromatic moiety. 1,2,4-Tris(2-trichlorosilylethyl)-cyclohexane, 1,8-bis(trichlorosylyl)-octane and 1-(trichlorosilyl)-octane may serve as examples.

Organic compounds which contain at least one of the moiety >SiHal$_2$, e.g., dimethylsilylchloride.

Halogen hydrosilanes of the general formula Si(H)$_m$(Hal)$_{4-m}$ wherein m is from 3 to 1 di- and trivinylbenzenes, e.g., 1,4-divinylbenzene.

In the context of coupling two cases are to be distinguished. If the block C is formed exclusively from butadiene and isoprene, any one of the abovementioned coupling agents will be suitable. If the block C also includes styrene units as part of the structure, it is advantageous to employ divinylbenzene as the coupling agent.

The process may be conducted discontinuously as well as continuously.

The person skilled in the art will be able by means of the tan delta curve to produce block copolymers by varying the reaction conditions which can be processed into the treads having the desired combinations of properties.

The amorphous polymers obtained will be mixed with active reinforcing fillers, a vulcanizing agent and conventional additives if they are to be converted into vulcanization products. Generally speaking, it is necessary to carry out such mixing in the presence of shear force effects.

Compositions which are intended for the manufacture of tire threads are generally formed as uncured strips. During the homogenization and molding which may for example take place in an extruder the conditions of temperature and time are so selected that no vulcanization takes place.

The rubber component in the vulcanizable compositions may for example comprise 70 to 100 wt% of a block copolymer according to the invention and 0 to 30 wt% of the rubber selected from the group of known amorphous general purpose rubbers, e.g., styrenebutadiene rubber, 1,4-cis-polybutadiene, 1,4-cis-polyisoprene and natural rubber.

Active, reinforcing fillers are for example tire tread carbon black compositions of various activities, optionally treated with silane bonding agents, highly dispersed silicic acids and mixtures thereof.

Conventional vulcanizing agents contain, e.g., sulphur in combination with accelerators. The amount of vulcanizing agents depends on the remaining components in the vulcanizable composition and can be determined by simple preliminary tests.

Plasticizer oils as conventionally used in rubber technology, preferably aromatic, aliphatic and naphthenic hydrocarbons and conventional auxiliaries, for example zinc oxide, stearic acid, resin acids, ageing protective agents and ozone protective waxes may serve as additive, added in conventional quantities.

The block copolymers according to the invention, are suitable for the manufacture of tire treads for automobile tires and truck tires, and not only for the manufacture of new tires, but also for the retreading of old tires.

The tire treads are characterized in particular by the following advantageous properties:
high-skid resistance under wet conditions,
high abrasion resistance,
low rolling resistance and thus low fuel consumption,
high wear resistance, and
all-weather suitability.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

In the examples, the following process parameters, reaction conditions and property measurement techniques were observed:

A hydrocarbon mixture is employed as the solvent, comprising about 50 wt% hexane. Additional components of this hydrogenated C$_6$ fraction were in particular pentane, heptane and octane and their isomers. The solvent was dried over a molecular sieve of pore size 0.4 nm, such that the water content was lowered below 10 ppm, followed by N$_2$ stripping.

The organic lithium compound was n-butyllithium which, unless stated otherwise, was employed in the form of a 20 wt% solution in hexane.

The monomers isoprene and styrene were boiled under reflux over calcium hydride for 24 hours prior to use, distilled off and titrated to the end point with n-butyllithium in the presence of o-phenanthroline.

The glycol ethers were distilled over calcium hydride and subsequently titrated to the end point with n-butyllithium in the presence of O-phenanthroline.

The divinylbenzene (DVB) was present as a mixture of m- and p-divinylbenzene and was employed in the form of a 64 wt% solution in hexane. The extent of conversion was determined by determining the solids content after evaporating off the solvent and the monomers.

The tan delta curves were determined with a dynamic viscoelastometer (Type Rheovibron supplied by Toyo Measuring Instruments Co. Ltd., Japan) at a vibration frequency of 1 Hz (cf. D. J. Massa J. Appl. Physics 44, 2595 (1973).

The coupling yield is considered to be the percentage of rubber which after the conversion with a coupling agent comprises a star-shaped structure and is characterized as compared with the non-coupled rubber by a considerably higher molecular mass. This is determined by GPC analysis, tetrahydrofuran being used as solvent and polystyrene as the column material. The polymers are characterized by means of a light scattering detector. For that purpose samples are taken from the reactor prior to the addition of the coupling agent and also towards the end of the reaction.

Processing of the polymerization product comprises drying of the product.

EXAMPLE 1

225 parts hexane (technical C$_6$ fraction), 46.5 parts butadiene and 0.20 parts DVB were introduced into a first V2A stainless steel agitating autoclave, rinsed with dry nitrogen. The polymerization was started at 50° C. by the addition of 0.54 parts n-butyllithium. In spite of cooling, the temperature rose briefly to a maximum of 58° C. After 75 minutes, once the 1,3-butadiene input had been virtually completely converted, an IR sample was taken.

Immediately thereafter, in a matter of 3 minutes, the contents of a second V2A stainless steel agitator autoclave (50° C.) were added. The latter contained a solution titrated with n-butyllithium, of 20.2 parts 1,3-butadiene and 33.3 parts isoprene in 80 parts hexane. 10 minutes later two samples were taken. The first sample showed that 60 wt% of all the monomers introduced had been converted. The second sample served for the IR-analysis.

Immediately thereafter, 0.85 parts diethylene glycol dimethyl ether were added. The temperature was kept constant. 3 hours after the start the polymerization was stopped by the addition of a solution of 0.5 parts 2,2'-methylene-bis-(4-methyl-6-tertiarybutylphenol) in 2 parts moist toluene. The solvents and non-converted isoprene were distilled off with steam, and the polymerization product was dried for 24 hours at 70° C. in a circulating air drying cabinet.

EXAMPLE 2

A titrated solution of 284 parts hexane, 65 parts 1,3-butadiene and 0.054 parts DVB was introduced into a first agitating autoclave. The polymerization was started at 40° C. by the addition of 0.054 parts n-butyllithium. The temperature was held in the range of 40° to 42° C. by cooling. After 265 minutes, after 90 wt% of the 1,3-butadiene introduced had been converted, 0.7 parts glycol diethyl ether were added. After a further 30 minutes and after the 1,3-butadiene had been converted almost completely, an IR-sample was taken.

Immediately thereafter, the contents of a second agitator autoclave (50° C.) were added in a matter of 2 minutes. The latter contained a solution titrated with butyllithium of 2 parts 1,3-butadiene and 25 parts isoprene in 200 parts hexane. The temperature was held in the range of 45° to 48° C. After the monomers had been converted virtually completely (approximately 2.5 hours) the polymerization was stopped and the polymerization product was processed.

EXAMPLE 3

A titrated solution of 270 parts hexane, 70 parts 1,3-butadiene and 0.054 parts DVB was introduced into a first agitating autoclave. The polymerization was started at 40° C. by the addition of 0.056 parts n-butyllithium. The temperature was maintained in the range of 40° to 44° C. by cooling. After 25 minutes, after 67 wt% of the 1,3-butadiene introduced had been converted, 0.7 parts glycol diethyl ether were added. After a further 30 minutes, after the 1,3-butadiene had been converted virtually completely, an IR sample was taken.

Immediately thereafter the contents of a second agitating autoclave (50° C.) were added in a matter of 1.5 minutes. The latter contained a solution titrated with butyllithium of 3 parts 1,3-butadiene, 16 parts isoprene and 11 parts styrene in 146 parts hexane. The temperature was maintained in the range of 47° to 50°. After the monomers had been converted virtually completely (about 115 minutes) the polymerization was stopped and the polymerization product was processed.

EXAMPLE 4

335 parts hexane, 60 parts 1,3-butadiene and 0.035 parts DVB were introduced into a V2A stainless steel agitating autoclave. The polymerization was started at 50° C. by the addition of 0.055 parts n-butyllithium, and the reaction temperature was maintained between 50° and 52° C. by cooling. After the 1,3-butadiene introduced had been converted virtually completely (after 174 minutes) an IR sample was taken.

Immediately thereafter, within 75 seconds, the contents of a second V2A agitating autoclave were added. The latter contained a solution titrated with butyllithium of 10 parts 1,3-butadiene, 15 parts isoprene and 15 parts styrene in 187 parts hexane at a temperature of 50°. 4 minutes thereafter two samples were taken. The first sample showed that 68 wt% of the total introduced monomer had been converted. The second sample served for IR analysis.

Immediately thereafter one part glycol diethyl ether was added and the temperature was maintained at 50° C. 4 minutes after the commencement of the polymerization a solution of 0.5 parts 2,2'-methylene-bis-(4-methyl-6-tertiarybutylphenol) in two parts moist toluene were added. Subsequently the solvent was distilled off with the aid of steam and the polymerization product was dried for 24 hours at 70° C. in a circulating air drying cabinet.

COMPARATIVE EXAMPLE A

The block copolymer 1 according to EP-OS 0 173 791 was produced as described therein on pages 16, 19 and 20.

FIG. 1 shows the tan delta curve of vulcanized test bodies (produced in analogy to the prescribed procedure for SBR in accordance with ISO 2322-1985 (E) Series A) with ABC block copolymers according to Examples 1, 3 and 4 and comparative Example A. It is clearly apparent that the tan delta curve of Examples 1,3 and 4 in accordance with the invention is wider than the tan delta curve according to the comparative example (Example 1 of EP-OS 0 173 791).

TABLE I

| Percentage proportions of the structural elements obtained by the polymerization of the following monomers | | | | | | |
|---|---|---|---|---|---|---|
| | Butadiene | | Isoprene | | | Sty- |
| | 1,4-trans | 1,4-cis | 1,2- | 1,4- | 3,4- | rene |
| Ex. 1 | | | | | | |
| Block A | 53 | 38 | 9 | — | — | — |
| Block AB | 52 | 36 | 8 | 3 | <1 | — |
| Block ABC | 30 | 20 | 23[1] | 1 | 26 | — |
| Ex. 2 | | | | | | |
| Block AB | 43 | 33 | 24 | — | — | — |
| Block ABC | 30 | 21 | 25[1] | 2 | 22 | — |
| Ex. 3 | | | | | | |
| Block AB | 38 | 28 | 34 | — | — | — |
| Block ABC[2] | 29 | 21 | 29[1] | <1 | 11 | 10 |
| Ex. 4 | | | | | | |
| Block A | 51 | 37 | 12 | — | — | — |
| Block AB | 51 | 36 | 10 | 2 | 1 | 0.5 |
| Block ABC | 33 | 23 | 15[1] | 2 | 10 | 17 |
| Ex. A | | | | | | |
| Block ABC | 23 | 13 | 34[1] | 5 | 26 | |
| Ex. B | | | | | | |
| Block A | 54 | 35 | 11 | | | |
| Block AB | 31 | 22 | 47 | | | |

[1] Including isoprene-1,2
[2] The content of polystyrene blocks amounts to 0.3 wt % based on the block copolymer

TABLE II

| | Parts by mass of blocks A, B and C in the ABC block copolymer in wt %* | | | Proportion of 1,2-butadiene and 3,4-isoprene units in |
|---|---|---|---|---|
| | Block A | Block B | Block C | in block C wt % |
| Ex. 1 | 46 | 14 | 40 | 90 wt % |
| Ex. 2 | 59 | 6 | 35 | 90 wt % |
| Ex. 3 | 47 | 23 | 30 | 90 wt % |

TABLE II-continued

| | Parts by mass of blocks A, B and C in the ABC block copolymer in wt %* | | | Proportion of 1,2-butadiene and 3,4-isoprene units in block C wt % |
|---|---|---|---|---|
| | Block A | Block B | Block C | |
| Ex. 4 | 60 | 8 | 32 | 90 wt % |

*determined by evaluation of the IR spectrum

TABLE III

Characterization of the ABC block copolymers

| Example | Mooney Viscosity | Defo Elasticity of ABC Block copolymers | non-uniformity U |
|---|---|---|---|
| Ex. 1 | 87 | 42 | 4.6 |
| Ex. 2 | 51 | 38 | 1.6 |
| Ex. 3 | 48 | 30 | 1.4 |
| Ex. 4 | 54 | 23 | 1.3 |
| A | 76 | 27 | 1.3 |

COMPARATIVE EXAMPLE B (according to GB-PS 2 090 840)

550 parts hexane, 100 parts butadiene and 0.1 parts DVB are introduced into an agitating autoclave. The polymerization was started at 50° C. with 0.068 parts n-butyllithium, the temperature reaching at the most 54° C. After 25 minutes, after a conversion of 45 wt% had been attained, an IR sample was taken.

Immediately thereafter 0.67 parts diethylene glycol dimethyl ether were added and the polymerization was continued, the temperature reaching a maximum of 56° C. After the conversion had been completed (approximately after 60 minutes) the reaction mixture was processed in the usual manner.

The AB block copolymer at the glass transition temperature of −67° C. exhibited a narrow damping maximum.

EXAMPLE 5

654 parts hexane and 67 parts 1,3-butadiene were introduced into a V2A stainless steel autoclave rinsed with dry nitrogen. Heating then took place to 50° C. and titration with thermal electric control was done with a 5 wt% solution of n-butyllithium in hexane. The polymerization was started at 50° C. by the addition of 0.069 parts n-butyllithium. The temperature was kept constant by cooling. After 70 wt% of the butadiene feed had been converted an IR sample was taken and processed in the same manner as the final product.

Immediately thereafter 33 parts isoprene were added at 50° C., two samples being taken 10 minutes later. The first sample showed that 75 wt% of the total butadiene feed had been converted. The second sample was used for IR analysis.

Immediately thereafter 0.5 parts ethylene glycol diethyl ether were added. After 80 minutes a further sample was taken for GPC analysis.

Thereafter 0.7 parts DVB were added at 50° C. After 2 hours at 50° C. the charge was cooled to room temperature and 0.5 parts 2,2'-methylene-bis(4-methyl-6-tert.-butylphenol) were added. The rubber so obtained was precipitated with 4000 ml of a mixture of isopropanol and methanol in a volume ratio of 80:20 and dried for 24 hours at 70° C. in a circulating air drying cabinet.

The evaluation of the IR analysis revealed that the block C comprised 90 wt% structural units obtained by 1,2-polymerization of 1,3-butadiene and isoprene and by 3,4-polymerization of isoprene.

EXAMPLE 6

734 parts hexane and 75 parts 1,3-butadiene were heated to 50° C. in an agitating autoclave and titrated with a 5% n-butyllithium solution. The polymerization was started at 50° C. by the addition of 0.074 parts n-butyllithium. The temperature was kept constant by cooling. After 65 wt% of the butadiene had been converted, 0.56 parts ethylene glycol diethyl ether were added. After 85 wt% of the 1,3-butadiene had been converted an IR-sample was taken.

Immediately thereafter 25 parts isoprene were added at 50° C. After 80 minutes a further sample was taken for GPC-analysis.

Thereafter 1.53 parts DVB were added. After 2 hours at 50° C. the polymerization was stopped and the polymerization product was processed.

The evaluation of the IR-analysis revealed that the block C comprises 90 wt% structural units obtained by 1,2-polymerization of 1,3-butadiene and isoprene and by 3,4-polymerization of isoprene.

EXAMPLE 7

643 parts hexane and 72 parts 1,3-butadiene were heated to 50° C. in an agitating autoclave and titrated with a 5 wt% n-butyllithium solution.

The polymerization was started at 50° C. by the addition of 0.068 parts n-butyllithium. The temperature was kept constant by cooling. After 65 wt% of the butadiene had been converted, 0.56 parts ethylene glycol diethyl ether were added. After 95 wt% of the 1,3-butadiene had been converted an IR-sample was taken.

Immediately thereafter, 16.5 parts isoprene and 11.5 parts styrene were added at 50° C. After 80 minutes a further sample was taken for GPC analysis.

Thereafter 1.38 parts DVB were added. After 2 hours at 50° C. the polymerization was stopped and the polymerization product was processed.

The evaluation of the IR analyses revealed that the block C comprised 90 wt% of the structural units obtained by 1,2-polymerization of 1,3-butadiene and isoprene, by 3,4-polymerization of isoprene and by polymerization of styrene.

EXAMPLE 8

654 parts hexane and 67 parts 1,3-butadiene were introduced into a V2A stainless steel agitating autoclave rinsed with dry nitrogen. This was followed by heating to 50° C. and titration with a 5 wt% solution of n-butyllithium in hexane using thermal electric control.

The polymerization was initiated at 50° C. by the addition of 0.074 parts n-butyllithium. The temperature was kept constant by cooling. After 55 wt% of the butadiene had been converted, an IR-sample was taken and the final product was processed.

Immediately thereafter, 33 parts isoprene were added at 50° C.; 10 minutes thereafter two samples were taken. The first sample revealed that 58 wt% of the overall input of butadiene had been converted. The second sample served for IR-analysis.

Immediately thereafter, 0.76 parts 1-ethyoxy-2 tert. butoxy-ethane were added. After 80 minutes a further sample was taken for GPC analysis.

Thereafter 1.51 parts DVB were added at 50° C. After 2 hours at 50° C. cooling to room temperature took place and 0.5 parts 2,2'-methylene-bis-(4-methyl-6-tert.-butyphenol) were added.

The rubber so obtained was precipitated with 4000 ml of a mixture of isopropanol and methanol in a volume ratio of 80:20 and dried for 24 hours at 70° C. in a circulating air drying cabinet.

The evaluation of the IR-analysis revealed that the block C comprised 90 wt% structural units obtained by 1,2-polymerization of 1,3-butadiene and isoprene and by 3,4-polymerization of isoprene.

TABLE IV

Characterization of the star-shaped ABC block copolymers in accordance with Examples 5, 6, 7 and 8

| No. | Mooney-Viscosity | Defo Elasticity U | $Z^{(1)}$ | Macrostructure K | wt %[(2)] |
|---|---|---|---|---|---|
| 5 | 63 | 33 | 1.0 | 5 | 80 |
| 6 | 58 | 30 | 2.1 | 8 | 80 |
| 7 | 58 | 26 | 2.56 | 9 | 80 |
| 8 | 60 | 35 | 2.0 | 9 | 85 |

[(1)]Z = numerity = number of arms
[(2)]K = coupling yield

TABLE V

Percentage proportion of the structural elements obtained by polymerization of the following monomers

| | Butadiene | | Isoprene | | | Styrene |
|---|---|---|---|---|---|---|
| | 1,4-trans | 1,4-cis | 1,2-[(1)] | 1,4- | 3,4- | |
| Ex. 5 | | | | | | |
| Block A | 54 | 38 | 8 | — | — | — |
| Block AB | 51 | 33 | 10 | 5 | <1 | — |
| Block ABC | 32 | 23 | 14 | 4 | 27 | — |
| Ex. 6 | | | | | | |
| Block AB | 42 | 30 | 28 | — | — | — |
| Block ABC | 33 | 22 | 24 | 1 | 20 | — |
| Ex. 7 | | | | | | |
| Block AB | 41 | 29 | 30 | — | — | — |
| Block ABC | 29 | 21 | 26 | 3 | 10 | 11 |
| Ex. 8 | | | | | | |
| Block A | 56 | 36 | 8 | — | — | — |
| Block AB | 54 | 33 | 8 | 4 | <1 | — |
| Block ABC | 30 | 20 | 20 | 4 | 26 | — |

[(1)]including isoprene-1,2

Figure 2:
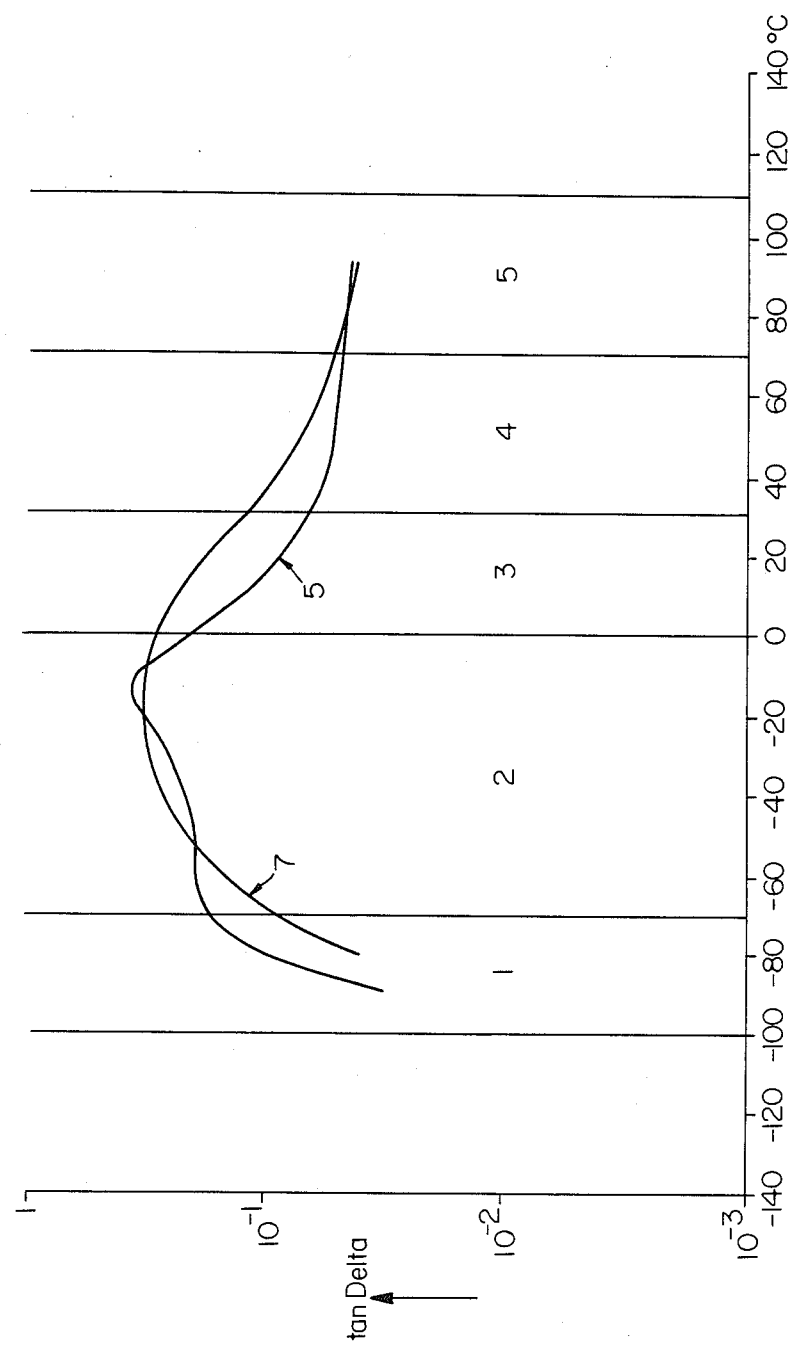

FIG. 2 shows the tan delta curve of vulcanized test bodies (produced in analogy to the instruction for SBR in ISO 2322-1985 (E) Series A) with the ABC block copolymers of Examples 5 and 7.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An unsaturated elastomeric block copolymer comprising:
    (a) about 40–75 wt% of a block A consisting of butadiene units and having a content of uniformly distributed vinyl groups of less than about 15 wt%;
    (b) about 1–25 wt% of a block B containing butadiene and isoprene units with a vinyl content of less than about 15 wt%, or butadiene units having a vinyl content of more than about 75 wt%; and
    (c) about 20–55 wt% of a block C containing butadiene and isoprene units having a vinyl content of more than about 75 wt%,
wherein the total monomer concentrations are about 40–80 wt% 1,3-butadiene, about 5–40 wt% isoprene and about 0–30 wt% styrene.

2. A block copolymer according to claim 1, wherein the proportion of isoprene units in block B is 0–33 wt%.

3. A block copolymer according to claim 1, wherein the proportion of butadiene units in block C is about 5–40 wt%.

4. A block copolymer according to claim 1, wherein block B contains up to 40 wt% styrene.

5. A block copolymer according to claim 1, wherein block C contains up to 40 wt% styrene.

6. A block copolymer according to claim 4, wherein block C contains up to 40 wt% styrene.

7. A block copolymer according to claim 1, wherein said block copolymer is branched.

8. A polymerization process for the production of block copolymers according to claim 1, comprising anionic polymerization of monomers in an inert organic solvent and in the presence of a Li-organic compound acting as a catalyst, wherein
    (a) block A is produced by polymerizing butadiene in the absence of a cocatalyst;
    (b) block B is produced by polymerizing (1) a mixture of butadiene and isoprene in the absence of a cocatalyst, or (2) polymerizing butadiene in the presence of a cocatalyst; and
    (c) a block C is produced by polymerizing a mixture of butadiene and isoprene in the presence of a cocatalyst.

9. A process according to claim 8, wherein the entire butadiene feed of the process is introduced at the start of the polymerization process and step (b), without addition of butadiene, is performed after at least about 40 wt% conversion of the monomeric butadiene.

10. A process according to claim 8, wherein block B is produced by step (b) (1) and the entire isoprene feed of the process is introduced during step (b) (1) and the polymerization of block C is performed after at least about 40 wt% conversion of monomeric butadiene and isoprene has been attained.

11. A process according to claim 8, further comprising adding styrene during step (b) as a comonomer.

12. A process according to claim 8, further comprising adding styrene during step (c) as a conomoer.

13. A process according to claim 11, further comprising adding styrene during step (c) as a comonomer.

14. A process according to claim 8, wherein a monofunctional Li-organic compound is employed as a catalyst.

15. A process according to claim 8, wherein glycol ethers of the formula $R_1$—(O—$CH_2$—$CH_2$)$_n$—O—$R_2$ are employed as cocatalyst, wherein n=1 or 2 and $R_1$ and $R_2$ each independently represent an alkyl moiety having 1 to 4 C atoms.

16. A process according to claim 15, wherein n=1 and the alkyl moieties $R_1$ and $R_2$ of the glycol ether have different numbers of C atoms.

17. A process according to claim 8, further comprising subjecting the polymers obtained after complete polymerization to branching by addition of a coupling agent.

18. A process according to claim 8, wherein at least one of the process steps (a)–(c) of the polymerization process is performed in the presence of divinylbenzene.

19. In a process for the manufacture of tire treads, wherein the improvement comprises employment of a block copolymer according to claim 1 for the manufacture of said tire treads.

20. A tire tread comprising a block copolymer of claim 1.

21. A block copolymer according to claim 1, wherein said copolymer contains 40-65 wt% of block A and block A consists of butadiene units with a content of uniformly distributed vinyl groups of 8-15 wt%.

22. A block copolymer according to claim 1, wherein said copolymer contains 5-15 wt% of block B and block B contains either butadiene and isoprene units with a vinyl content of 8-15 wt% or butadiene units with a vinyl content of 75-90 wt%.

23. A block copolymer according to claim 1, wherein said copolymer contains 30-50 wt% of block C and block C comprises butadiene and isoprene units having a vinyl content of 75-90 wt%.

24. A block copolymer according to claim 1, wherein block B comprises 5-40 wt% styrene.

25. A block copolymer according to claim 1, wherein block C comprises 5-40 wt% styrene.

26. A block copolymer according to claim 7, wherein the amount of branching within the block copolymer is 50-90 wt%.

27. A process according to claim 9, wherein the entire butadiene feed of the process is introduced at the start of the polymerization process and step (b), without addition of butadiene, is performed after at least about 50 wt% conversion of the monomeric butadiene.

28. A process according to claim 10, wherein block B is produced by step (b) (1) and the entire isoprene feed of the process is introduced during step (b) (1) and the polymerization of block C is performed after at least about 45 wt% conversion of monomeric butadiene and isoprene has been obtained.

29. A block copolymer according to claim 1, wherein said block copolymer has a Mooney viscosity of about 40-140, a nonuniformity of about 0.5-5.0 and a Defo elasticity of greater than about 10.

30. A block copolymer according to claim 1, wherein said block copolymer has a Mooney viscosity of 35-120, a nonuniformity of 0.6-3.0 and a Defo elasticity of greater than 20.

* * * * *